UNITED STATES PATENT OFFICE.

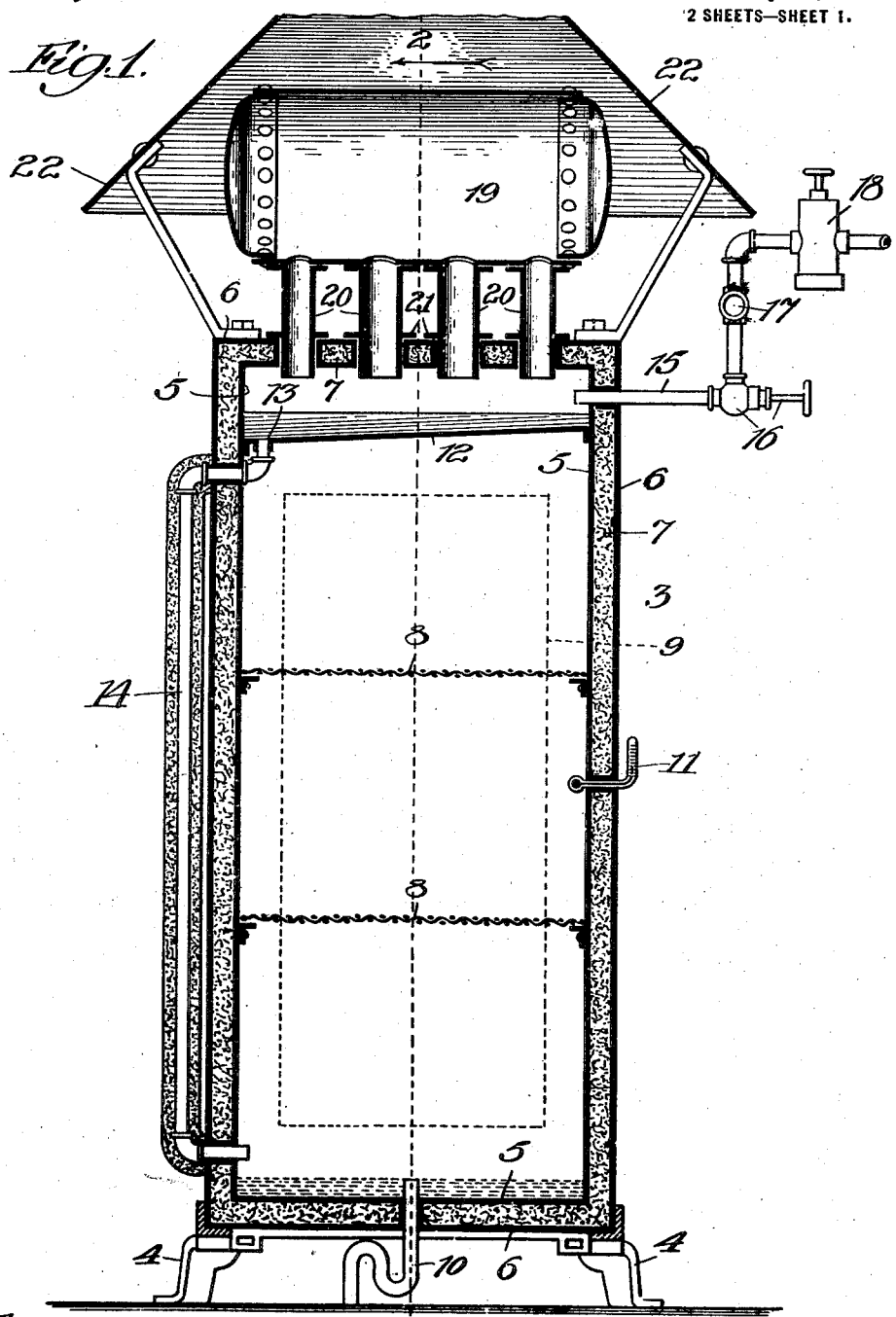

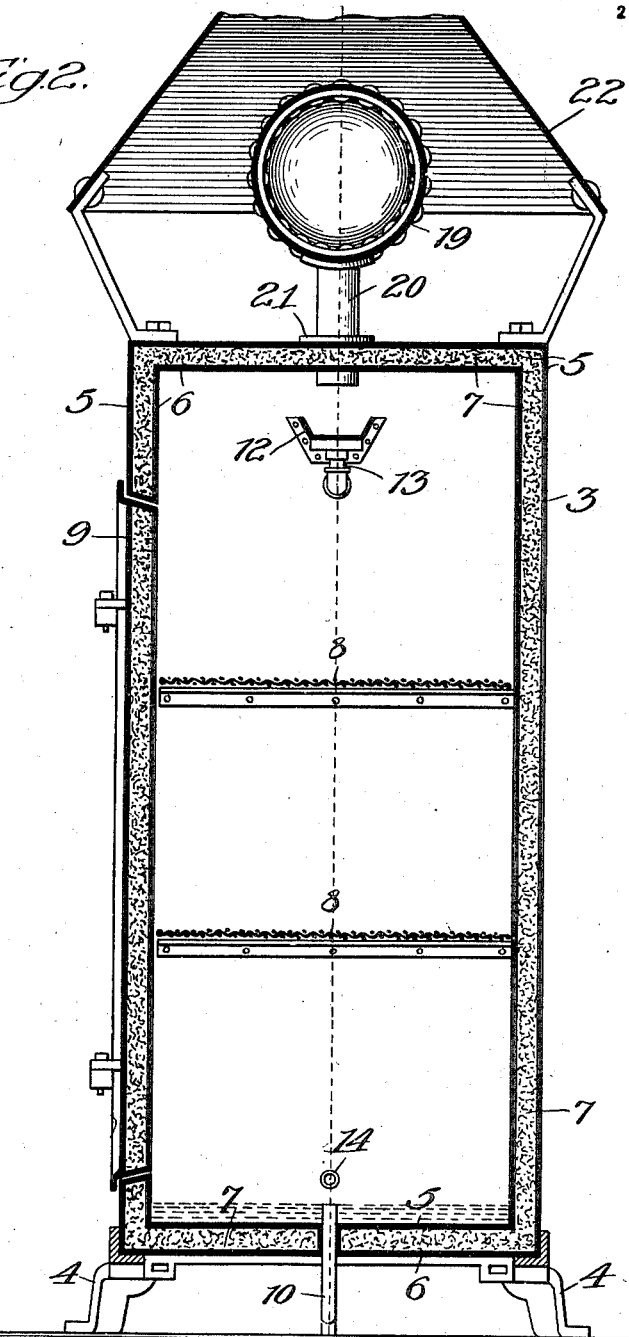

CHARLES B. TRESCOTT, OF CHICAGO, ILLINOIS.

ART OF COOKING.

1,226,147. Specification of Letters Patent. Patented May 15, 1917.

Application filed October 7, 1916. Serial No. 124,252.

*To all whom it may concern:*

Be it known that I, CHARLES B. TRESCOTT, a citizen of the United States, residing at Chicago, in the county of Cook and State of Illinois, have invented a new and useful Improvement in the Art of Cooking, of which the following is a specification.

This invention relates to an improvement in the art of low-temperature cooking, in which the temperature employed is below that for boiling water, the maximum for cooking meats being about 180° F. and that for cooking vegetables about 200° F.

In a known process of low-temperature cooking, the air in the cooking chamber is saturated with water sprayed into it continuously during the cooking operation, and heated to the predetermined temperature (by the sprayed water when hot or by other means when the water used is cold), whereby a superfluity of the water is provided to serve as a vehicle for carrying the heat-units which attack the matter undergoing the cooking, and gradually effect the cooking thereof by distributing the heat uniformly to and properly cooking such matter while preventing shrinkage thereof in cooking, and retaining the juices and natural flavor of meats and the natural flavor of vegetables.

However, the known process referred to is not sufficiently economical to invite its adoption in all situations, since it involves the copious use of water under pressure and more or less expensive apparatus for supplying it and regulating the temperature for insuring perfection of the cooking.

It is the primary object of the present improvement to simplify the art of low-temperature cooking by employing live steam as the primary source of heat for heating and saturating the air in the cooking chamber, but so reducing the temperature of the steam, which must be below that of the boiling point of water, before exerting its heating influence on the air in such chamber as to impart to such air the predetermined temperature for the cooking purpose.

Apparatus suitable for the practice of my improved process is illustrated in the accompanying drawings, in which—

Figure 1 is a partly broken view of the apparatus in vertical sectional elevation, the section being taken on line 1, Fig. 2; and Fig. 2 shows the apparatus in side elevation, with a portion of the surmounting hood broken away.

The cooking chamber 3, which as shown is of preferred rectangular cross-section and is supported on legs 4, is best constructed of an inner casing of very thin sheet-metal and a similar outer casing 6 forming an interposed space, which is filled with insulating material 7, preferably ground cork. At different elevations, perforate shelves 8 are supported removably in the chamber, which is provided with a hinged door 9 of ample dimensions for facilitating the introduction of matter, to be cooked, into the chamber and its removal therefrom. This door is constructed and insulated, like the double casing, and the casing and door envelop the entire chamber. A trapped drain-pipe 10 leads through the chamber-bottom from a point above its inner surface to discharge to any desired point; and a thermometer 11 is shown in Fig. 1 projecting through the chamber near the center of one side thereof. In the upper end of the cooking chamber is supported a narrow trough 12 to extend centrally and inclinedly across the chamber and discharge at its lower end, through a flanged opening 13 there provided, into the upper end of a pipe or conduit 14 extending out through the chamber-wall and downwardly along the chamber to reënter the latter near its bottom. This pipe is insulated, as represented, with asbestos or other suitable insulating material.

A steam-inlet pipe 15, provided with a needle-valve indicated at 16, leads into the chamber 3 above the trough, from a steam-pipe 17, which receives its supply of live-steam from any suitable source (not shown) and contains a shut-off valve 17 and a pressure-reducing valve device, indicated at 18, which may be of any well-known or desired type.

A drum 19, of very thin metal and preferably sheet copper to quickly radiate heat, is supported to extend above the chamber on a row of tubular legs 20 projecting downwardly through the top of the chamber and bearing thereon at their flanges 21. For the purpose hereinafter described, the intermediate legs are of somewhat greater diameter than the outer ones, as shown.

An upwardly tapering hood 22 is supported on the top of the chamber 3 to cover the drum 19 and conduct off, through a chimney-pipe (not shown) the heat radiated into the hood through the drum.

To employ the described apparatus for the low-temperature cooking purpose, steam is admitted, on opening the valves 17 and 16, into the upper part of the chamber 3 under a comparatively low pressure of say 10 to 20 pounds, to which it is reduced by properly setting the valve-device 18. The valve 16 is opened at first sufficiently to admit a copious supply of the steam to expedite the initial heating up of the chamber 3 to the desired temperature as hereinafter described. Steam entering through the pipe 15 rises through the legs 20 into the drum 19 into contact with its surfaces, which rapidly conduct off sufficient of the heat to lower the temperature of the steam below that of the boiling point of water and reduce it to a fog-like condition. The steam tends to enter the drum mainly, because more freely, through the wider central legs 20, and the hot fog-like condensate passes downwardly through the narrower outer legs, thereby producing a circulation of the vapors in the drum tending to cause uniform distribution to and radiation of heat through its wall. The condensate is received from the tubular legs into the trough, whence it passes through the conduit 14 into the chamber 3, in which the hot vapors distribute themselves to saturate with moisture its contained air and heat the chamber-walls and the air to the required cooking temperature of about 140° to 180° F. for meats (the lower temperature for the tenderer meats and the higher for the tougher varieties) and about 200° F. for vegetables. When the chamber 3 has been initially heated, as described, and matter to be cooked has previously been placed therein, to be preliminarily heated the needle-valve 16 should be set to reduce the supply of steam into the chamber to the amount required for maintaining therein the predetermined cooking temperature, the thermometer 11 serving as a guide in this connection for adjusting the valve from time to time to prevent material variation from that temperature. However, after the initial heating of the chamber, when the needle-valve has been once set for any cooking operation, it will require infrequent, if any, re-setting, since the chamber is so thoroughly insulated that it retains the heat without requiring much steam to be supplied to compensate for the slight loss; but it is, of course, very important to avoid overheating, and the needle-valve may require occasional re-adjustment for that purpose.

While it is preferable to introduce the hot vapors produced by reducing the temperature of the steam by radiating off its surplus heat, into the bottom of the cooking chamber, that is not essential. A body of hot water, the level of which is indicated in Fig. 1, is caused to accumulate in the chamber 3 during the cooking operation by placing the mouth of the drain-pipe 10 at that level, to afford a body of hot water from which hot vapors continually rise, thereby to enhance the desirable uniformity of distribution of those vapors throughout the air in the chamber for saturating it with moisture and heating it.

As in the aforesaid known process, the importance of saturating the heated air in the cooking chamber with moisture lies in affording an augmented vehicle for carrying the heat-units to the matter undergoing cooking, whereby the latter is cooked to a mellow condition uniformly throughout under the comparatively low temperature, and this with comparative rapidity because of the large number of heat-units.

It will be apparent that by practising my improved process in the manner described, it is rendered simple and economical, compared with the known process referred to, and reliable in its operation, without requiring much attention, since the consumption of steam is at low pressure and small, and it requires, for practising it, a very simple apparatus involving only one valve for possibly required adjustment during the cooking operation.

What I claim as new and desire to secure by Letters Patent is:

1. In the art of low-temperature cooking with moisture-saturated hot air in the cooking-chamber, the process which consists in using live-steam as the primary source of heat and moisture, cooling the steam to reduce its temperature, and continuously introducing during the cooking operation the resultant hot condensate into said chamber to produce and maintain therein the predetermined cooking temperature and saturated condition of said air.

2. In the art of low-temperature cooking with moisture-saturated hot air in the cooking chamber, the process of directing live steam through said chamber to an extraneous cooling medium, thereby lowering the temperature of the steam, and continuously directing during the cooking operation the resultant hot condensate into said chamber to produce and maintain therein the predetermined cooking temperature and saturated condition of said air.

3. In the art of low-temperature cooking with moisture-saturated hot air in the cooking-chamber, the process of directing live steam through the upper part of said chamber into an elevated cooler to lower the temperature of the steam, and continuously passing, during the cooking operation, the resultant hot condensate downwardly into said chamber to produce and maintain therein the predetermined cooking temperature and saturated condition of said air.

4. In the art of low-temperature cooking with moisture-saturated hot air in the cooking-chamber, the process of directing live-steam under low pressure through the upper part of said chamber into an elevated cooler to lower the temperature of the steam, running the resultant hot condensate downwardly into said upper part of the chamber and there intercepting it, and introducing said condensate from the point of interception into the lower part of said chamber to form a body of hot liquid therein and produce and maintain in the chamber the predetermined cooking temperature and saturated condition of its contained air.

CHARLES B. TRESCOTT.